United States Patent [19]

Mohan et al.

[11] 4,373,135

[45] Feb. 8, 1983

[54] PITCH MATCHING DETECTING AND COUNTING SYSTEM

[75] Inventors: William L. Mohan; Samuel P. Willits, both of Barrington; Thomas E. Kleeman, Elgin, all of Ill.

[73] Assignee: Spartanics, Ltd., Rolling Meadows, Ill.

[21] Appl. No.: 108,548

[22] Filed: Dec. 31, 1979

[51] Int. Cl.³ .............................................. G06M 9/00
[52] U.S. Cl. ........................................... 377/8; 377/53
[58] Field of Search .......... 235/92 SB, 92 PS, 92 PK, 235/92 V; 250/571, 224, 222 R

[56] References Cited

U.S. PATENT DOCUMENTS

| Re. 27,869 | 1/1974 | Willits et al. | 235/92 SB |
| 3,790,759 | 2/1974 | Mohan et al. | 235/92 SB |
| 3,813,523 | 5/1974 | Mohan et al. | 235/92 SB |
| 3,835,306 | 9/1974 | Bills et al. | 235/92 SB |

Primary Examiner—Joseph M. Thesz
Attorney, Agent, or Firm—Jacque L. Meister

[57] ABSTRACT

An apparatus for counting stacked sheet-like materials having low or ambiguous contrast characteristics associated with their edges. A single non-pitch matched sensor is used to synthesize sensor output data that is the equivalent of that generated by pitch matched single or plural sensors. Automatic correction for errors in pitch match of the sensor and automatic velocity determination are provided. Sensor signal synthesis is accomplished through use of a multiple output tap analog delay line functioning as a discrete time processor.

34 Claims, 22 Drawing Figures

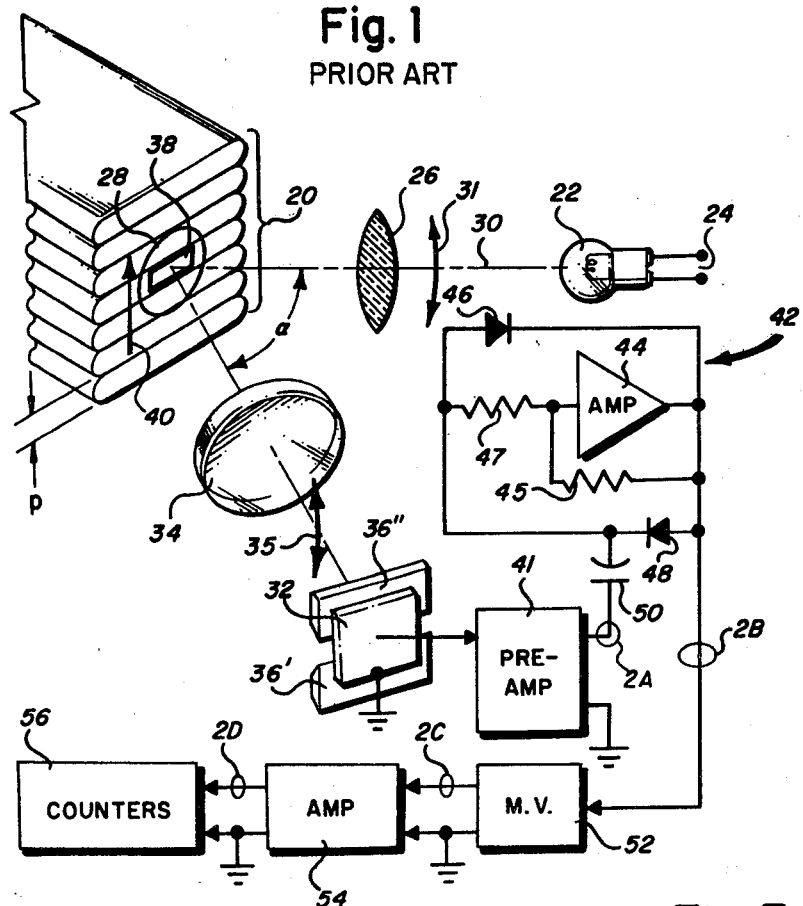
Fig. 1
PRIOR ART
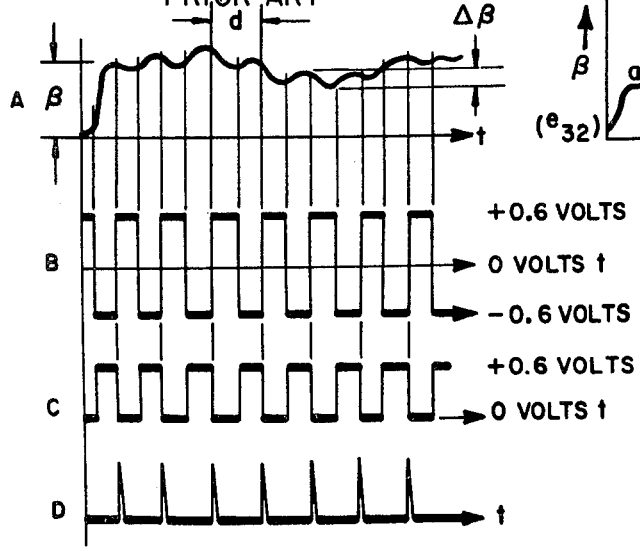
Fig. 2
PRIOR ART
Fig. 3
PRIOR ART

PITCH MATCHING DETECTING AND COUNTING SYSTEM

BACKGROUND OF THE INVENTION

This invention relates generally to article counting apparatus and more particularly to sensing and indicating apparatus for counting a plurality of substantially identical objects stacked adjacent to one another and either with or without spaces intervening between objects. More specifically, this invention relates to improvements with respect to the article counting apparatus disclosed by SAMUEL P. WILLITS and WILLIAM L. MOHAN in U.S. Pat. No. RE 27,869, reissued Jan. 1, 1974. The improvements of this invention relate to novel means to achieve signal enhancement and pitch matching utilizing a single sensor in the optical system and use of an electrical delay line to achieve the equivalent of a pitch matched variable width, half-line, single-line or multi-line pair sensor.

In the aforementioned WILLITS et al. patent, there was described apparatus for counting the plural stacked objects it was desired to count. In particular, maintenance of particular relationships between effective sensor size and stacked object size and particular circuitry combined under the conditions described in that application made high speed counting of plural stacked objects feasible, even where relatively low contrast gradients between adjacent ones of the stacked objects was encountered. The WILLITS, et al., specification further discussed several means of achieving signal enhancement for conditions where low contrast gradients were encountered. Each of the signal enhancement methods of that application in essence provided for matching of effective sensor width to the pitch of the stacked objects. Additional signal enhancement was provided by paired plural sensor arrangements, electrically connected in push-pull arrangements.

While the apparatus of the earlier WILLITS, et al, patent solved many problems, and in most instances provided an excellent method for stacked object counting, because the effective width adjustment of the sensor, sensor pairs or arrays was achieved by adjusting the physical size and/or the optical configuration of the sensor arrangement to the pitch of the stacked objects, it was difficult to obtain the pitch adjustment to the desired degree of accuracy over a wide range of pitch widths. Further, because of the sharp edge characteristics of the sensors employed in the earlier patent, unwanted higher harmonics of the desired signal frequencies occurred as the sensor passed over discontinuities in the objects being scanned.

SUMMARY OF THE INVENTION

A principal object of the invention is to provide a new and improved stacked object detecting and counting system that overcomes the foregoing recited limitations of the prior art.

Still another object of the invention is to provide a new and improved stacked object detecting and counting system that achieves spatial filtering that is the equivalent of that which is achieved with pitch matched single or plural sensors using but a single sensor and synthesized data.

Yet another object of the invention is to provide in a stacked object detecting and counting system, means for overcoming the unwanted higher harmonic generating effect of the sharp edge characteristics inherent in a scanning sensor.

A still further object of the invention is to provide a new and improved stacked object detecting and counting system having means for automatically correcting any error in the pitch match of the sensors to the pitch of the stacked objects to be counted.

And yet another object of the invention is to provide a new and improved stacked object detecting and counting system having means for automatically determining the velocity of the system sensors relative to the stacked objects.

The foregoing and other objects of the invention are achieved in the preferred embodiment of the invention through the use of a single sensor whose effective width when imaged on a stacked object is very narrow as compared to the width or pitch of the stacked object. The output of this very narrow sensor is electrically coupled to a multiple tapped analog delay line in a specific manner to achieve a spatial filtering effect and, simultaneously overcome the generation of the unwanted higher harmonics of the sensor signal. The output of the sensor is first amplified and then quantized into plural discrete time domain packets by the tapped analog delay line and these packets are reassembled in a specific time delay sequence and at a sampling rate determined, in part, by object pitch, into the equivalent of ½ line or sensor-pair data, as desired, that can be processed in a similar fashion to that described in the earlier WILLITS, et al, specification. The nature of the invention and its several features and objects will appear more fully from the following description made in connection with the accompanying drawings.

DESCRIPTION OF THE DRAWINGS

FIG. 1 is a schematic representation, partially in perspective showing a simple version of the prior art invention;

FIG. 2 is an output waveform diagram for the sensor of the prior art example of FIG. 1 also showing intracircuit waveforms;

FIG. 3 is a single sensor output waveform diagram illustrating so called half line data from the prior art single sensor embodiment of FIG. 1, illustrating the electrical output from an illustrative stack of plastic cards;

DESCRIPTION OF THE PREFERRED EMBODIMENTS

Figure 4:
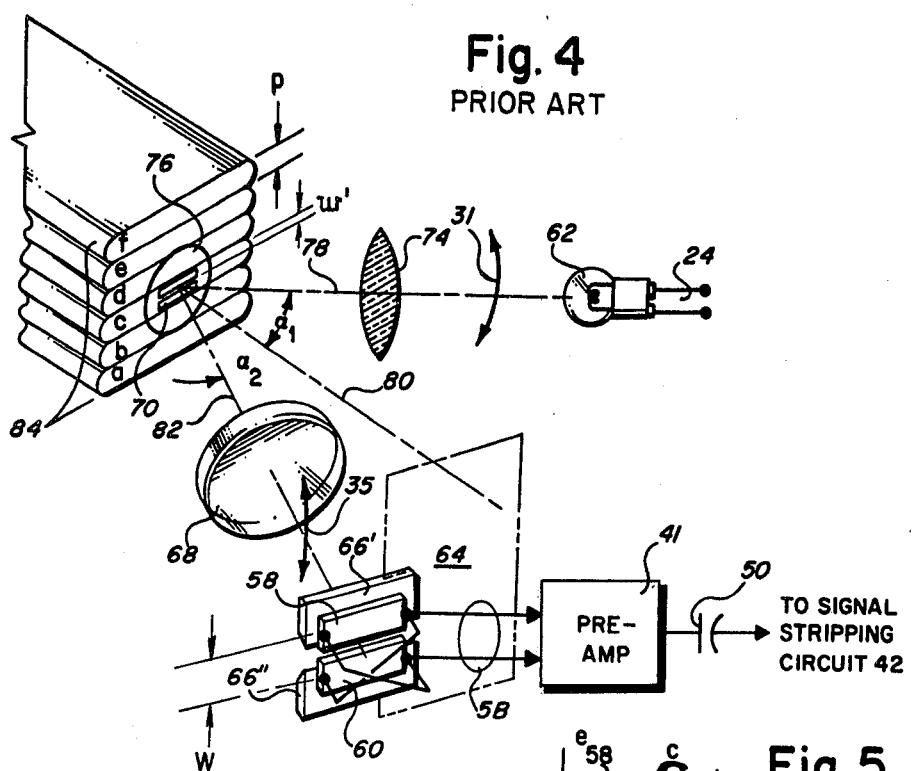
FIG. 4 is a schematic of the prior art embodiment illustrating the use of two sensors, a so-called single line pair, to form a simple spatial filtering system.

FIGS. 1-6 are illustrative of the prior art system for detecting and counting a plural stacked objects using the principal of pitch matching to enhance the signal obtained from a sensor that scans the stacked objects. FIGS. 1 through 3 illustrate in schematic form the principal components of the simplest single sensor form of the WILLITS, et al, prior art invention and the waveform outputs from its single sensor 32, a one-half line sensor system. The reference numerals here employed are identical to those of the prior art WILLITS, et al invention and the disclosure of that invention should be consulted for a detailed explanation of FIGS. 1-6. It is essential to note that the effective width of the sensor 32 as imaged at 38 is critical and is adjusted as described in the aforesaid WILLITS patent to enhance the second cyclic component in the sensor output signal while simultaneously suppressing the third cyclic component; the second cyclic component being representative of the difference characteristic associated with each object and the third cyclic component being due to plural natural characteristics of each object or noise. Since, on the average, signal enhancement and noise suppression are optimized when the imaged sensor effective width is approximately ½ pitch of p, the system of FIG. 1 is generally characterized as a half-line sensor system.

FIG. 3 illustrates the waveform output of single sensor array 32 when it encounters stacked objects of a type that provide none or a limited number of brightness reversals during the scanning traverse of the stacked objects. Where there is no brightness reversal, an ambiguity is present that the apparatus of FIG. 1 cannot resolve. These ambiguities are resolved however by the prior art plural sensor apparatus of either FIG. 4 or 6 with the resultant sensor output wavetrain from these apparatus appearing as in FIG. 5. As used herein, "a sensor array" is a generic term for the sensor system employed in the inventive apparatus and may comprise one or more sensors.

FIG. 4 schematically illustrates a prior art means of enhancing the sensor output signal which will resolve the ambiguities present in a waveform such as that of FIG. 3. In FIG. 4 the single sensor array of FIG. 1 is replaced with a sensor array consisting of a sensor pair, each of whose sensors image has an effective width matched to approximately one-half the pitch of the objects in the stack to achieve maximum second cyclic component enhancement and third cyclic component suppression.

Since images of the two sensors together approximately match the pitch of the objects in the stack, the system of FIG. 4 is generally characterized as a single line-pair sensor system and the output therefrom as a line-pair output signal.

Figure 5:
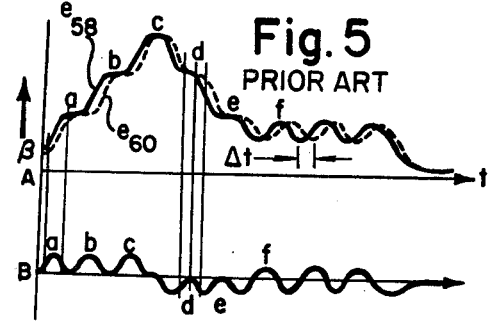
FIG. 5 illustrates the output waveforms of the prior art embodiment of FIG. 4 when they traverse a series of stacked objects.
Figure 6:
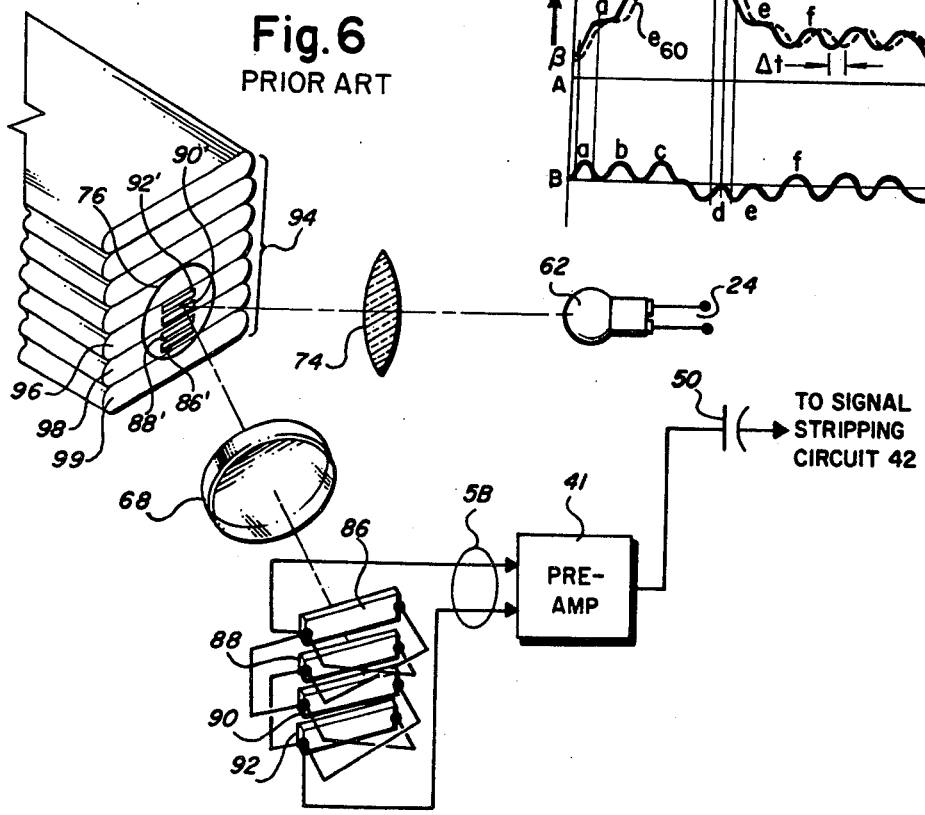
FIG. 6 is a schematic illustration of a prior art system employing two pairs of sensors, a two line pair system to achieve enhanced spatial filtering.

Each of the two sensors of FIG. 4 would, if not connected together as shown, generate an electrical signal output as they traverse the stack of objects to be counted. The outputs of the individual sensors are as shown at A in FIG. 5; $E_{60}$ the signal from sensor 60, is shown as leading the signal $E_{58}$, the signal from sensor 58, by the time interval $\Delta t$. The time delay $\Delta t$ is determined by the velocity v of the scanning sensor and, for an idealized pitch-match condition described above, the center-to-center dimension W of adjacent sensors in the array or, where $w=p/2$, $\Delta t=w/v$ or $\Delta t=p/2v$. When the sensors 58 and 60 are connected in parallel opposition, the combined sensor output signal is as shown in FIG. 5B. As can readily be seen, the FIG. 5B signal is comparable to that of FIG. 2A showing that the sensor array of FIG. 4 resolves the ambiguities that a single sensor would generate in a case such as FIG. 3.

Where object contrast is very low, the prior art teaches that signal characteristics are enhanced by the use of multiple sensors as shown in FIG. 6. In FIG. 6, two sensor cell-pairs make up the sensor array with each cell-pair imaged upon adjacent elements in the stack 94. The electrical output from each of these cells will generate single cell data delayed in time with respect to its adjacent cell by the interval $\Delta T$. The output sensor data for cell-pair 86-88 is connected in parallel opposition and cell-pair 90-92 is similarly interconnected. The two differential data signals are then electrically summed to give a two line-pair enhanced signal. This accomplishes both spatial filtering and spatial correlation with resultant enhanced data output as compared to either a single sensor half-line array or a two sensor single line-pair array.

While the foregoing methods of signal generation and enhancement continue to be useful, a feature of the present invention is the discovery that tapped analog delay lines permit a single sensor to function as the equivalent of several sensors and, thus, permit the accomplishment of several other desirable objectives. The use of multiple delay electrical data from a single sensor can be used to achieve synthesization of the data that would result from use of multiple sensors or sensor pairs, i.e., the spatial filtering and correlation required for image enhancement. An embodiment of the invention using these techniques and a single sensor to achieve the equivalent of the two line-pair system of FIG. 6 illustrated schematically in FIG. 7.

Figure 7:
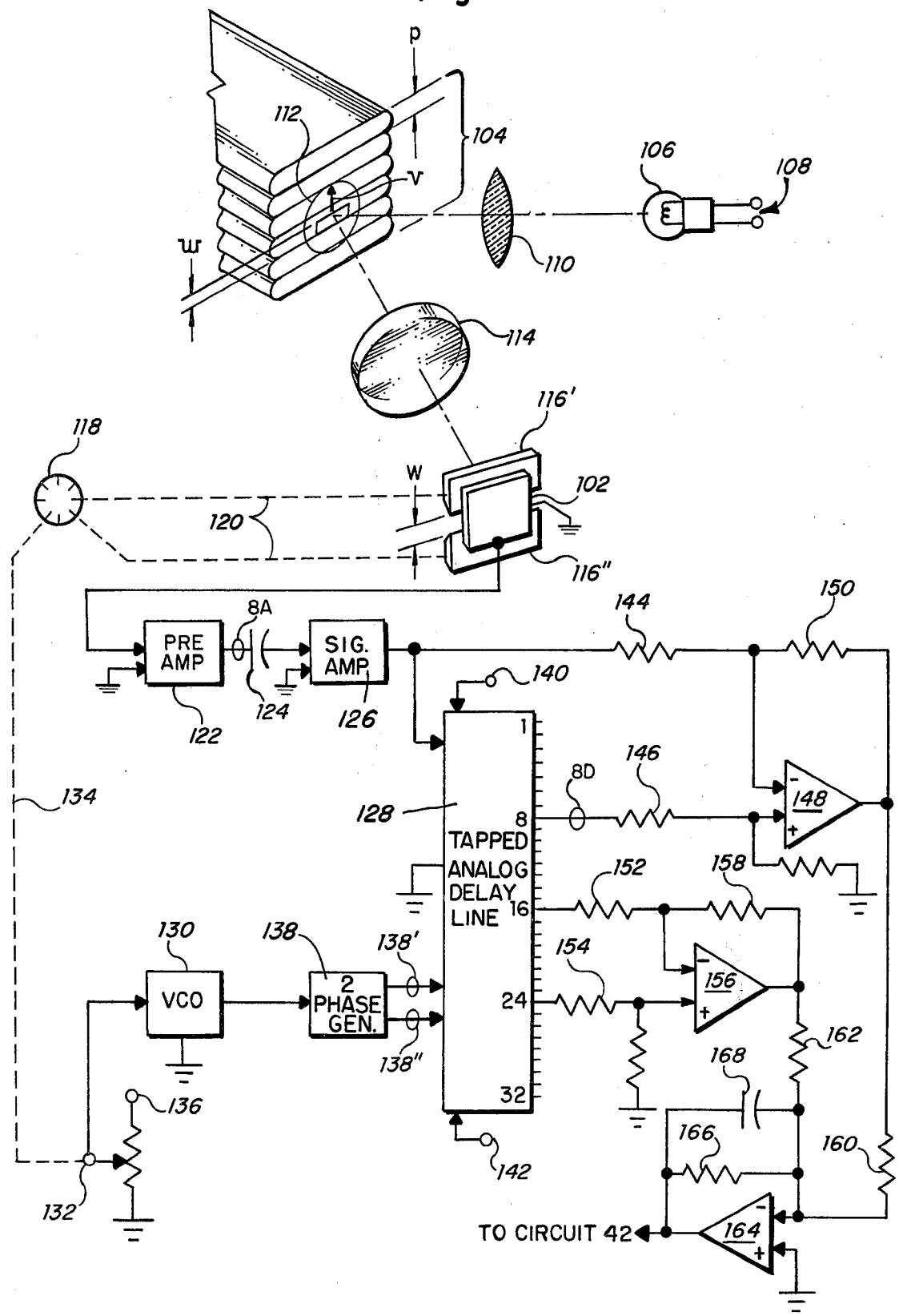
FIG. 7 is a schematic illustration of an invention embodiment using a single sensor to generate the equivalent data of the four sensor array multiple line pair of FIG. 6.

As shown in FIG. 7, the sensor array comprises a single sensor 102 positioned relative to a stack of similar objects 104 and a light source 106 that is focused by condensing lens 110 on the edges of the stacked objects 104 to form an illuminated area 112. The image of illuminated area 112 is formed by objective lens 114 in the plane of sensor 102 and adjustable masks 116' and 116". Width of the slit formed between masks 116' and 116" is adjusted by positioning pitch match dial 118 which is connected to the masks by means of linkages shown schematically as 120. Turning the dial adjusts masks spacing in response to movement of the dial. As shown, dial 118 has been set to adjust the spacing W of masks 116' and 116" so that the image thereof and the effective width of the sensor w imaged on the stack 104 is p/2. /Then as sensor 102 is caused to traverse or scan the stack in the direction and velocity indicated by vector v, an output wavetrain is generated by sensor 102 as shown at FIG. 8A. This wavetrain although shown in idealized form, is substantially the same as the wavetrain shown in FIG. 5A as $E_{58}$. This signal is then amplified in preamplifier 122.

The preamplified signal is then coupled by means shown as capacitor 124 to the input of signal amplifier 126 whose output is identical to way form 8 A except amplified. This output is, in turn, coupled to the input of a discrete time processor which advantageously, is a charge transfer, multiple output tap, analog delay line 128. Such delay lines are commercially available and the device shown schematically in FIG. 7 is such a commercial delay line with 32 output taps and using metal-oxide-silicon integrated circuit technology and with provisions for feeding forward so that multiple devices can be cascaded. The delay line 128 functions as a discrete-time processor with time quantized while signal amplitude retains its analog value corresponding to a time interval established by a "clock" input. The clock in FIG. 7 is a voltage controlled oscillator 130 whose output frequency f is made to track the pitch match setting of pitch match dial 118 by the setting of generator means shown as potentiometer 132 which is mechanically coupled to the dial by linkage 134. Potentiometer 132 is energized by a reference potential Ev applied at terminal 136, whose absolute magnitude is a constant determined by the system fixed scan velocity v, and a desired sampling interval $t_s$ of FIG. 8.

The output frequency of clock 130 is established to divide an output sensor data counting cycle λ, (FIG. 8A) into a preselected number of data samples. While more or less samples per cycle can be employed as explained below, sixteen data samples per cycle of output data has proven advantageous; i.e., interval sample time $t_s = \lambda/16$. This relationship is established by knowing the pitch p of the material, the fixed scan velocity, v, and the required sampling interval $t_s$ to generate sixteen sample intervals per cycle λ of sensor output counting data signal, where data signal frequency = v/p. Because the analog delay line 128 requires 2 complementary squarewave clock signals to transfer the charge state for each tap node, a two-phase generator 138 is employed to generate these clock signals at its outputs 138' and 138" in response to the input from oscillator 130. Generator 138 may be a conventional flip-flop; the principal requirement being that the rise and fall times be short. Because the two phase generator 138 divides the clock frequency by two, to obtain sixteen samples per data cycle, it is necessary for the output frequency f of oscillator 130 to be 32 times the data signal frequency.

Figure 8:
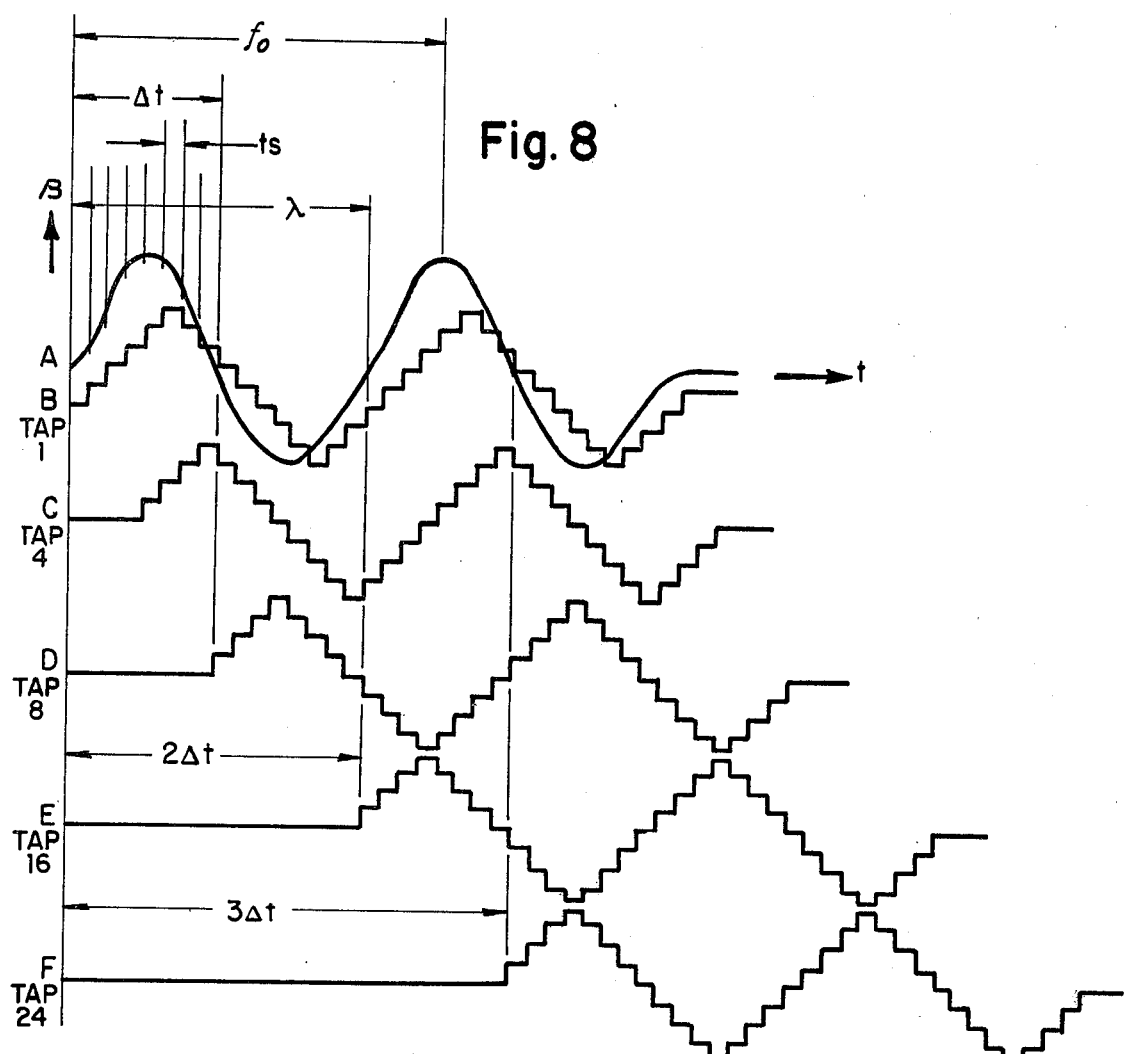
FIG. 8 is a waveform diagram showing the time domains associated with various ones of the tap outputs of the tapped analog delay line of FIG. 7.

In order to synthesize the second data train $E_{60}$, as shown in FIG. 5, which data is that generated by the second sensor of a one-line pair sensor array, it is only necessary to store and sample (delay) sensor data from sensor 102 at delay interval Δt as shown by FIG. 5. By observation of FIG. 8, it can be seen that the interval $\Delta_t$, which is equal to ½ data cycle, will be obtained after eight sample intervals and data sampled at tap node number 8 will have this $\Delta_t$ time separation. The data appearing at tap node number 8 for the input signal shown at FIG. 8A is shown in FIG. 8D. Similarly the data appearing at tap node number 16 is shown in FIG. 8E and at tap node number 24 at FIG. 8F. As can be seen, the data output at tap node 16 (FIG. 8E) is delayed by the time interval $2\Delta_t$ from the FIG. 8A input and at tap node 24 is delayed by $3\Delta_t$. Since this is precisely the condition for an ideally matched two-line pair sensor array, it can be seen that the data output of the sensor 102 and the outputs from taps 8, 16 and 24, completely synthesizes the output of a line-pair sensor array.

By differentially summing the amplified sensor 102's output data at amplifier 126 and delayed signal data at tap node number 8 through resistors 144 and 146 to amplifier 148 with feedback resistor 150; similarly differentially summing the data from tap node 16 and 24 through resistors 152 and 154 to amplifier 156 with feedback resistor 158 and then summing the outputs of amplifiers 148 and 156 by coupling them through resistors 160 and 162, respectively, into amplifier 164 which has feedback resistor 166 and feedback capacitor 168, the output of amplifier 164, will be the full equivalent of the output of the system of FIG. 6, a two-line pair system. As described in the aforesaid WILLITS, et al, patent, this output, appropriately corrected for extra counts, is passed to stripping circuit 42 and subsequent processing circuitry as shown and described in connection with FIG. 1 to effect a count of the number of stacked objects 104 that the sensor 102 passes across.

Figure 9:
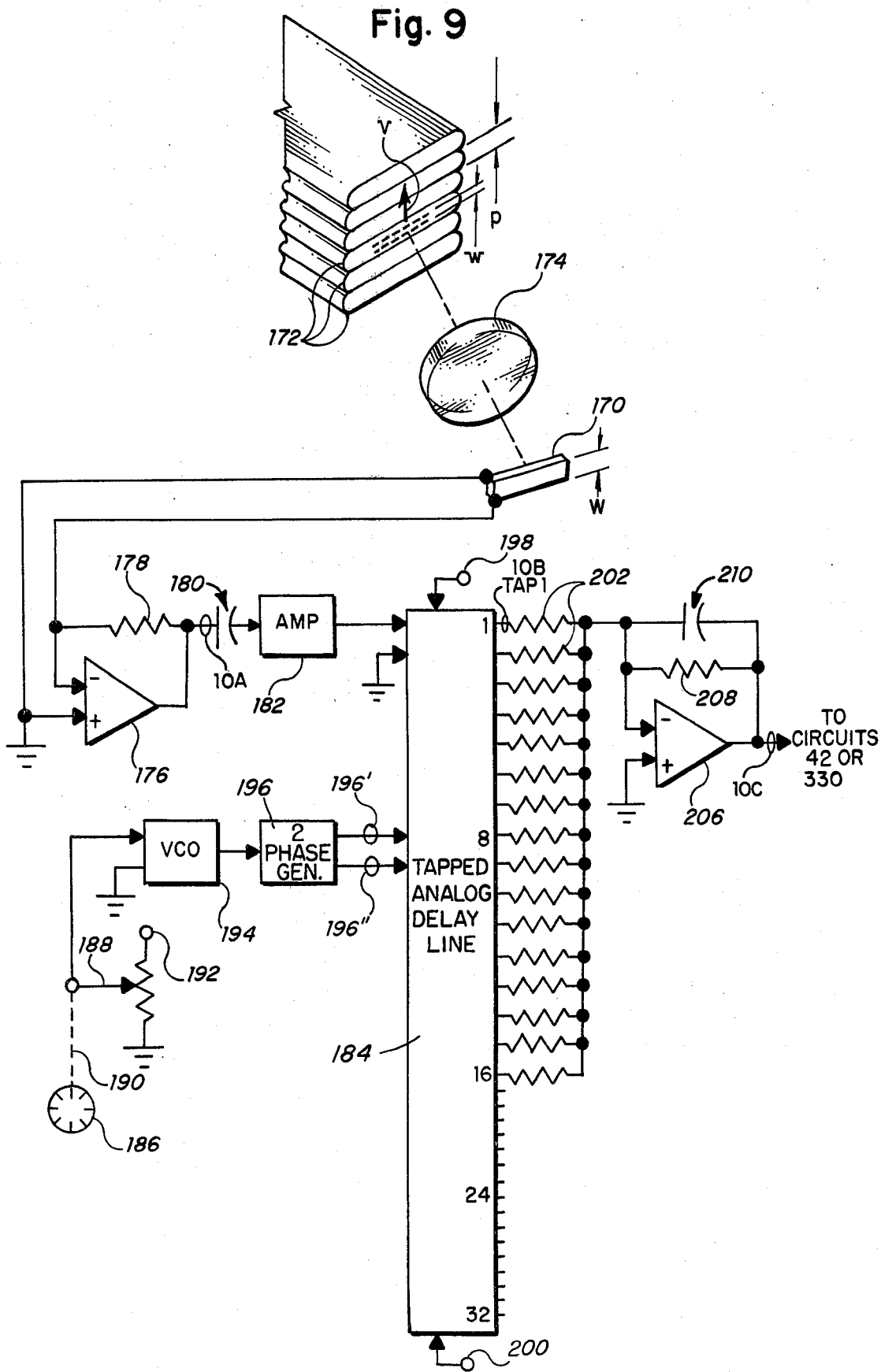
FIG. 9 is a schematic illustration of an invention embodiment utilizing electrical means to adjust the effective width of a single narrow sensor and having an output signal that is the equivalent of the half-line FIG. 1 sensor.

FIG. 9 is illustrative of the principal invention embodiment and shows schematically the generation of the equivalent of halfline sensor data from a single sensor whose effective width is very narrow compared to the pitch p of the elements in the stacked material to be counted. For simplicity of illustration, the light source of FIG. 1 is not shown. A sensor 170 of width W is imaged on stacked objects 172 by objective lens 174; the effective width of sensor 170 imaged on the stack being w. The effective width w of sensor 170 is made as narrow as possible compared to the pitch p of the stacked material 172. No exact physical relationship is necessary between the effective width w and pitch p except, that w should be maintained at less than p. In a practical system to be used for counting materials between 0.003 inches thick to 0.100 inches thick, an effective sensor width of 0.002 inches will permit the generation of usable counting data over this entire range of material thicknesses. By keeping w as narrow as possible, the flexibility or range of use of the device is enhanced since w can be expanded by the circuitry of the invention to produce a pitch match for a wide range of material thicknesses.

Figure 10:
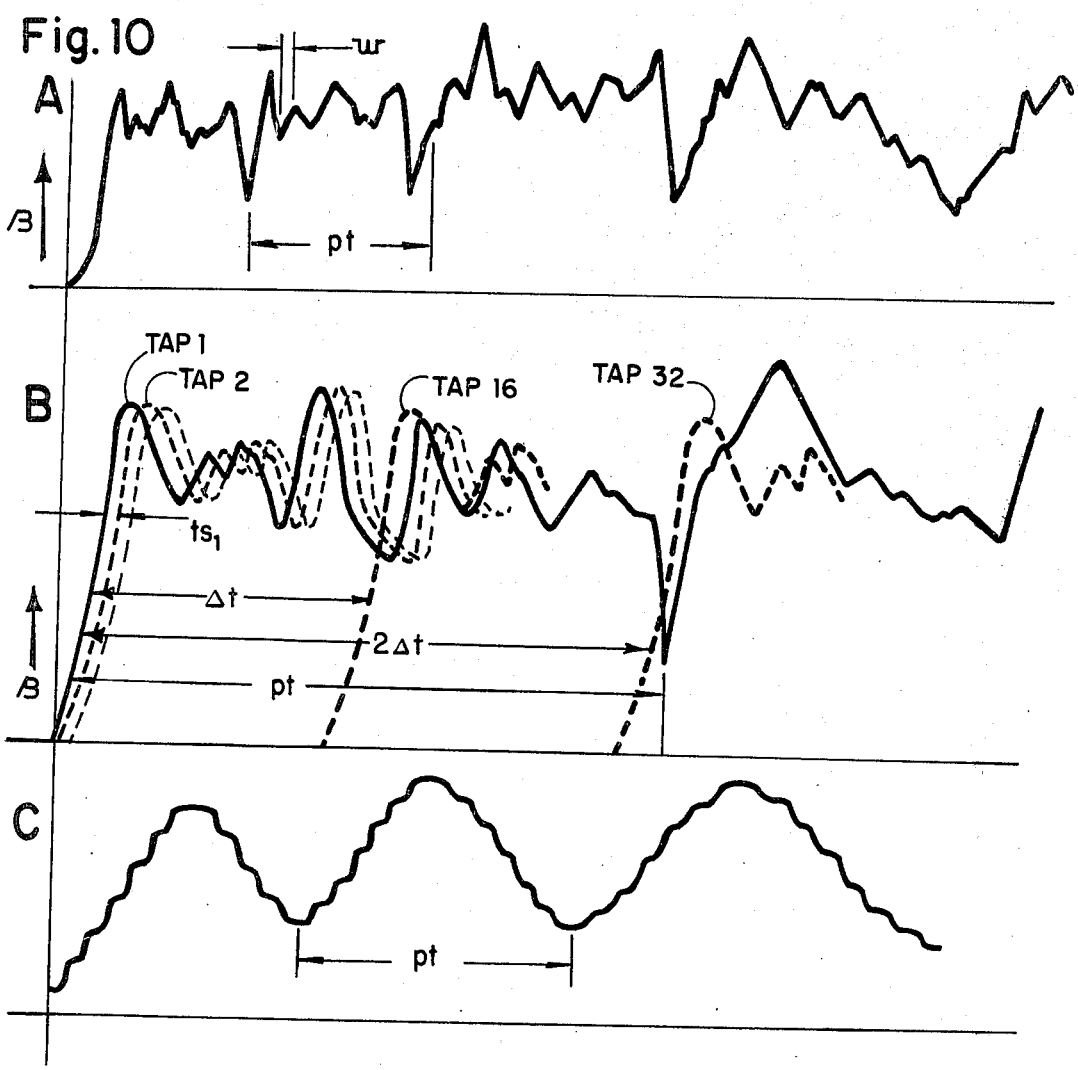
FIG. 10 A-C are waveform diagrams illustrating time sequenced sensor output data and the result of combining this data.

As shown by FIG. 2A, a single sensor, whose effective width is ideally matched to ½ of the width of an element in a stack to be counted, under ordinary conditions generates enhanced cyclic data, capable of being utilized for counting. By comparison, a single very narrow sensor traversing the same material would generate a very complex wavetrain, full of higher harmonics as shown in FIG. 10A. This very narrow sensor-light combination acts in a manner analogous to a surface luminescence reflectometer, profiling the surface brightness along its track. As can be seen from FIG. 10A, the data in a single cycle count interval pt, generated by such a very narrow sensor produces extraneous counting errors due to the signal ambiguities. To eliminate those ambiguities, the invention provides means for combining the data as generated by this very narrow sensor while traversing the stack of material to be counted and converting the combined data to the equivalent of the data generated by a larger sensor, having the effective width of p/2 or, in some embodiments, plural sensors of similar size. This is accomplished by successively sampling the narrow sensor's output data and storing these samples in a delay line having appropriate output taps so that the past history of the brightness profile can be combined so as to give the effect of a single sensor of width p/2, traversing the stack.

FIG. 10B shows the progression of this narrow sensor data through the delay line as would be seen at the various tap nodes and FIG. 10C shows this data as converted by the FIG. 9 circuitry to the equivalent of a half-line pitch matched single sensor.

The successive sampling of the sensor data requires a minimum of two samples for each material width traversed to conform to the Nyquist sampling theorem which states "the sample rate must be at least twice the frequency of the highest frequency component of interest in the wavetrain being sampled." However, more samples are desirable to increase resolution and to reduce subsequent filtering problems. As a practical matter, because commercially available delay lines have 32 output tap nodes, some integral ratio to that number has been selected for use as the number of samples for each material width traversed, and is described herein with reference to the various invention embodiments.

The principal circuitry elements of FIG. 9 are similar to those of FIG. 7 with the major differences being in the method of attaining pitch match and in the handling of the output from the tap nodes of the analog delay line. The output of sensor 170 in FIG. 9 is passed to pre-amplifier 176 with associated feedback resistor 178. The pre-amplified signal is then coupled by means shown as capacitor 182 to the input of signal amplifier 182 whose output is, in turn, coupled to the input of charge transfer analog delay line 184. As before, this device is shown as having 32 output tap nodes numbered 1–32, two input bias potentials applied at taps 198 and 200, and two complementary square wave clock signals input from two phase generator 196 at 196' and 196". The output clock frequency of two phase generator 196 is responsive to its input from voltage controlled oscillator 194 whose frequency is in turn determined by the voltage established by the setting of pitch match dial 186. The setting of pitch match dial 186 controls the voltage output from potentiometer 188 by means of linkage shown schematically at 190. Pitch match dial 186 is calibrated in terms of the pitch p or, material thickness. An input fixed scan velocity reference voltage is provided to potentiometer 188 at terminal 192. Thus, by setting the dial 186 to the selected pitch of the material to be counted, the potentiometer output voltage is set at a level that will yield an output frequency from oscillator 194 related to the desired number of samples per material width traversed or, per output count data cycle. As before, the output frequency of oscillator 194 is set at double the desired sampling rate to accommodate the frequency halving of two-phase generator 196. Thus, if $t_s \Delta_t/16$, the output 194' of the oscillator would be 32 times the data signal frequency.

Where sixteen sample intervals $t_s$ per half-data cycle has been chosen as desirable, the outputs of analog delay line 184 are summed by the sixteen resistor bank 202 for tap nodes 1–16 inclusive into amplifier 206. Amplifier 206 has feedback resistor 208 and capacitor 210. Capacitor 210 is a simple hash or switch noise filter having very little relationship to the band pass characteristics of the time domain generated data. While in this example, sixteen sample intervals have been selected for the half cycle period $\Delta_t$, any number of samples per data counting cycle pt, equal to or more than two as suggested by the Nyquist sampling theorem, can be selected providing only that the maximum sample interval is not more than ½ the time interval of the highest useful signal frequency expected to be encountered. The outputs of amplifier 206 can then be passed to the signal stripping circuit 42 of the prior art shown in FIG. 1 or processed by other circuitry as described in conjunction with FIG. 11. The output of amplifier 206 of FIG. 9 is a composite synthetic sensor output signal that is similar in all essential characteristics, to the outputs of the amplified half-line data output of sensor 32 of FIG. 1 or of sensor 102 of FIG. 7.

Figure 11:
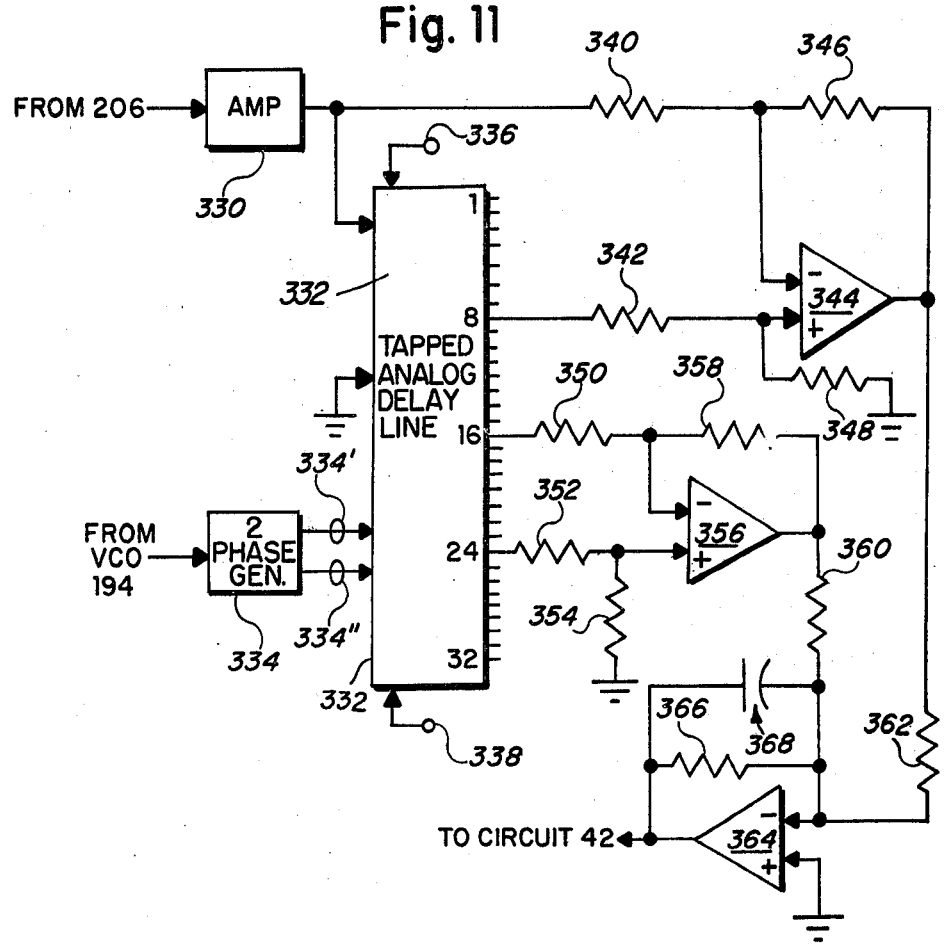
FIG. 11 illustrates schematically an invention embodiment utilizing the output of the FIG. 9 embodiment to form an output equivalent to the two line pair system of FIG. 6.

In FIG. 11, the ½ line signal data from amplifier 206 of FIG. 9 is amplified by signal amplifier 330 before coupling into analog delay line 332 having 32 output taps. As described in connection with FIG. 7, the output at each tap is quantized while signal amplitude retains its analog value for the time sampling interval established by a clock input. Voltage controlled oscillator 194 of FIG. 9, in combination with two-phase generator 334 provides that clock function. Terminals 336 and 338 provide input bias to delay line 332.

The output data is then processed in an identical manner to the processing of FIG. 7; that is, the synthetically generated half-line single sensor data and the output of tap node number 8 are differentially summed by resistors 340 and 342 into amplifier 344 with feedback resistor 346 and the output of tap nodes numbers 16 and 24, differentially summed by resistors 350 and 352 into amplifier 356 with feedback resistor 358. Then the output of amplifiers 344 and 356 are summed by resistors 360 and 362 into amplifier 364 with appropriate feedback resistor 366 and capacitor 368. From this it can be seen that the synthetically generated half-line data of FIG. 9 can be processed using the invention concept, to form an output equivalent to the four pitch matched sensors two-line pair system of the prior art shown in FIG. 6.

Figure 12:
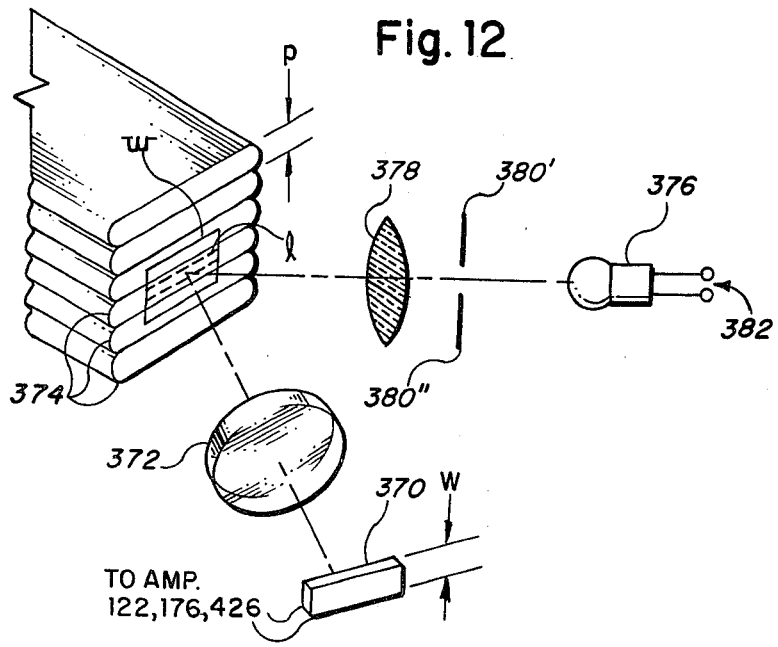
FIG. 12 schematically illustrates an invention embodiment for the optical control of sensor width.

In the foregoing discussion of FIG. 9, the effective width of the sensor w was made narrow by physically using a narrow sensor with appropriate optical imaging systems. It is a feature of the invention that this same result can be achieved by use of a relatively wide sensor whose imaged width w on the stacked objects is large compared to the pitch p. Then, the effective width of the sensor is controlled to be a narrow band by illumination techniques. One such system is illustrated in FIG. 12 where sensor 370 is imaged by objective lens 372 on plural stacked objects 374. The width W of the sensor is imaged at the stacked material as w and, as shown, the imaged width is greater than the pitch p. However, the effective width of the sensor is limited to the width l of illumination on the stack. The width l in FIG. 12 is determined by light source 376, condensing lens 378 and masks 380' and 380". By appropriately configuring these elements, the width l of the illumination on the stack can be made as narrow as necessary to yield a sensor effective width the same as achieved in the embodiment of FIG. 9.

One significant advantage of using the width of the light source at the stack to control sensor effective width is the ability to attain a great depth for the optical field. Laser light sources have proven especially useful in maintaining the narrow illumination beam widths desired especially when the distance from the source to the stacked objects varies widely.

Figure 13:
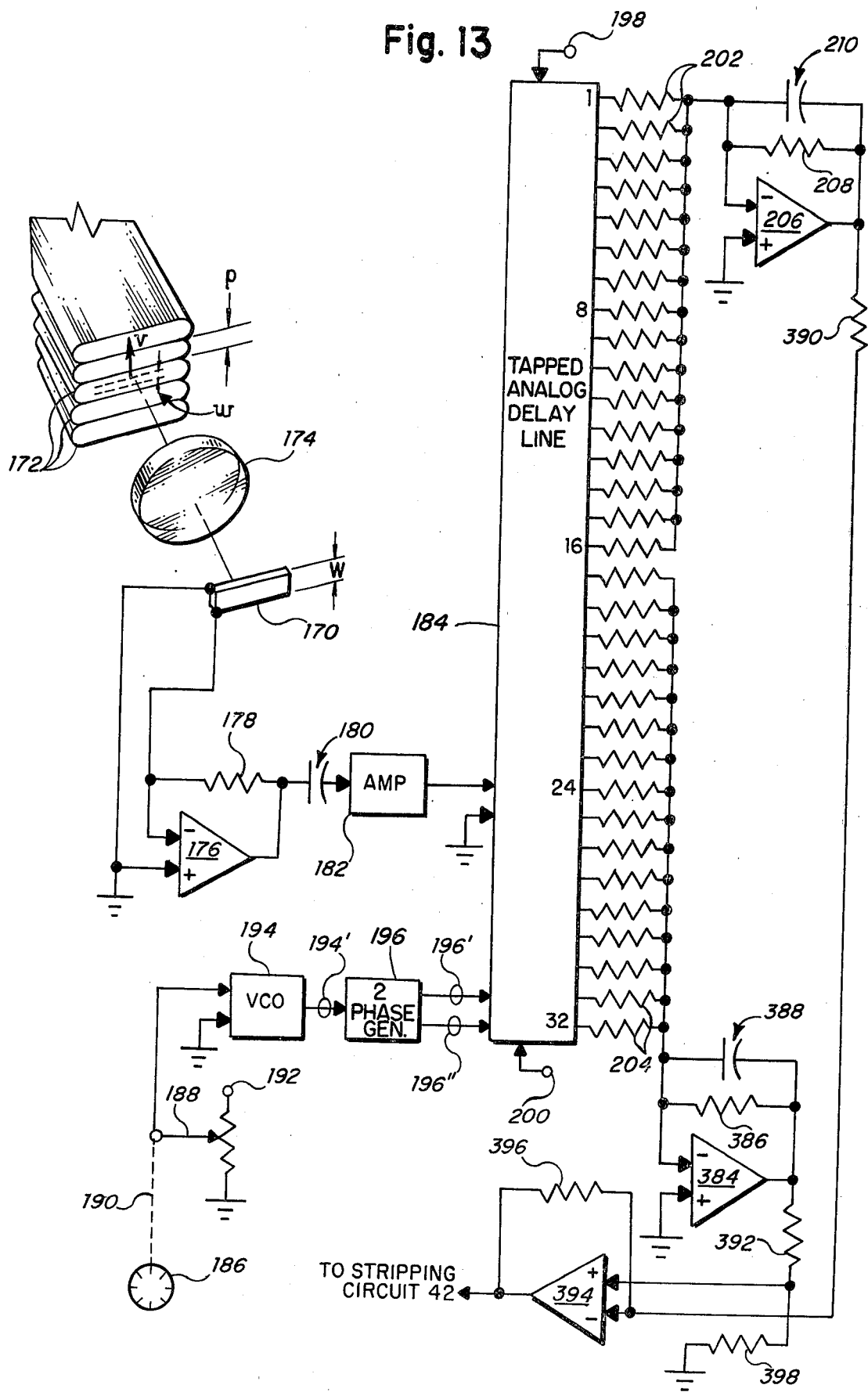
FIG. 13 is a schematic illustration of an invention embodiment utilizing electrical means to adjust effective width of a single narrow sensor and having an output the equivalent of a sensor pair electrically connected in push-pull (a so-called line-pair)

As FIG. 9 and its description illustrate, the output of a single very narrow sensor can be processed by the invention circuitry to be the equivalent of a half-line pitch matched single sensor suitable for counting or further processing in a manner analogous to that of FIG. 7. It is a feature of the invention that the output of the single very narrow sensor can be directly processed using the invention principals to be the equivalent of two, or more, half-line pitch matched sensors. FIG. 13 illustrates an embodiment of the invention similar to that of FIG. 9 in all essential respects but with an output equivalent to that of a single line pitch matched sensor pair. In FIG. 13, like elements have been assigned the identical reference numerals as in FIG. 9. However, all 32 output taps of analog delay line 184 are utilized; the outputs being summed by the sixteen resistor bank 202 for tap nodes 1–16 inclusive into amplifier 206, as before, while the outputs from tap nodes 17–32 inclusive are summed by sixteen resistor bank 204 into amplifier 384, the outputs of both amplifiers 206 and 384 each being half-line composite synthetic sensor output signals. Amplifier 384 has feedback resistor 386 and capacitor 388 functioning in a manner identical to resistor 208 and capacitor 210, previously described.

The outputs of amplifiers 206 and 384 are differentially summed in the circuit comprising resistors 390, 392 and 398 and amplifier 394 with feedback resistors 396. The output of amplifier 394 can then be supplied to the input of signal stripping circuit 42 of the prior art and thus processed for counting in the manner described in the WILLITS, et al, pattent. The output of amplifier 394 is the same as to all essential characteristics, as the output of the prior art circuitry of FIG. 4.

Figure 14:
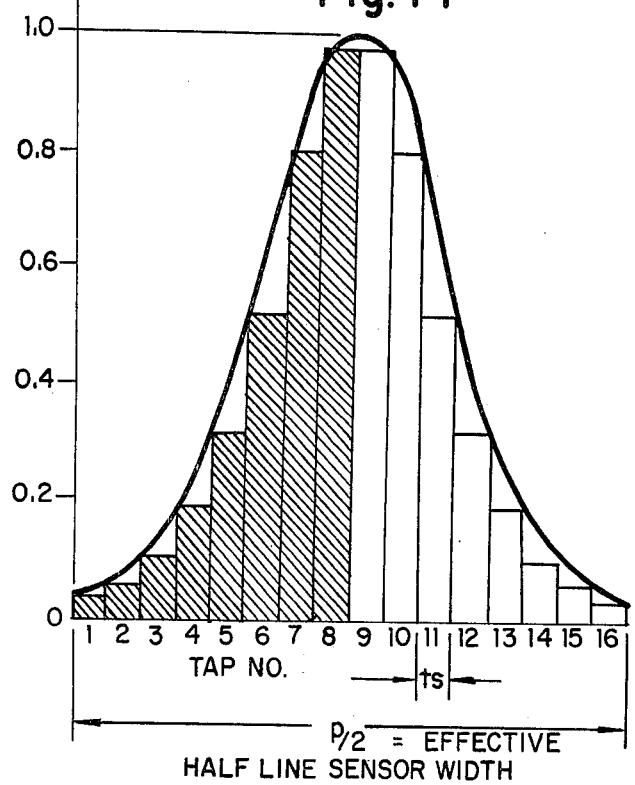
FIG. 14 illustrates graphically the weighting of the output taps of the analog delay line to generate a shaped transfer function to approximate sin x/x.
Figure 15:
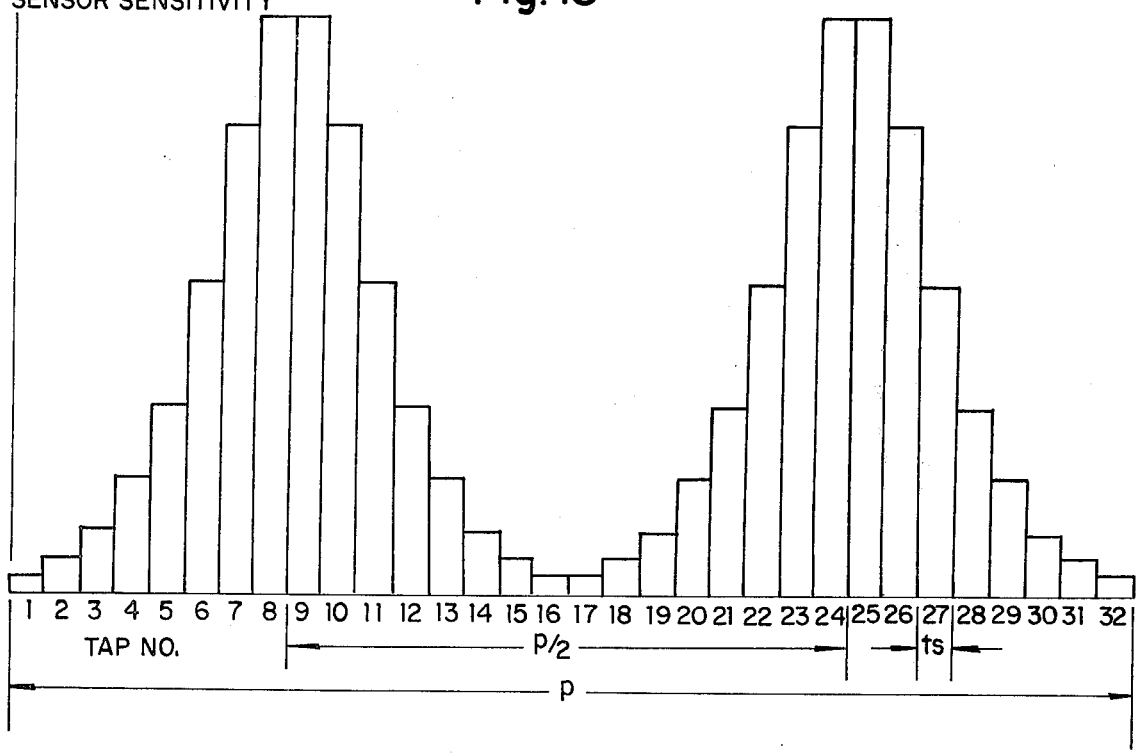
FIG. 15 graphically illustrates the weighting of the delay line output taps of FIG. 13 to achieve the equivalent of a "Hamming" weighted aperture.

It is a feature of the invention that by varying the resistance value of individual ones of the resistors comprising each of the resistor banks 202 and 204, a shaped transfer function such as shown in FIGS. 14 and 15 can be achieved. This is a well-known tool for the reduction of unwanted harmonics to a level below that which can be achieved with an ordinary rectangular or equal weighted window or aperture. The relative weights or value assigned to the various resistors to achieve the FIG. 14 transfer function results in what is known as a "Hamming" window.

It is a further feature of the invention that the electronically generated synthesized data at the final output of anyone of FIGS. 7, 11 or 13 can be used to automatically and electronically correct the set-in pitch match to the exact pitch required by the stacked material being counted.

Figure 17:
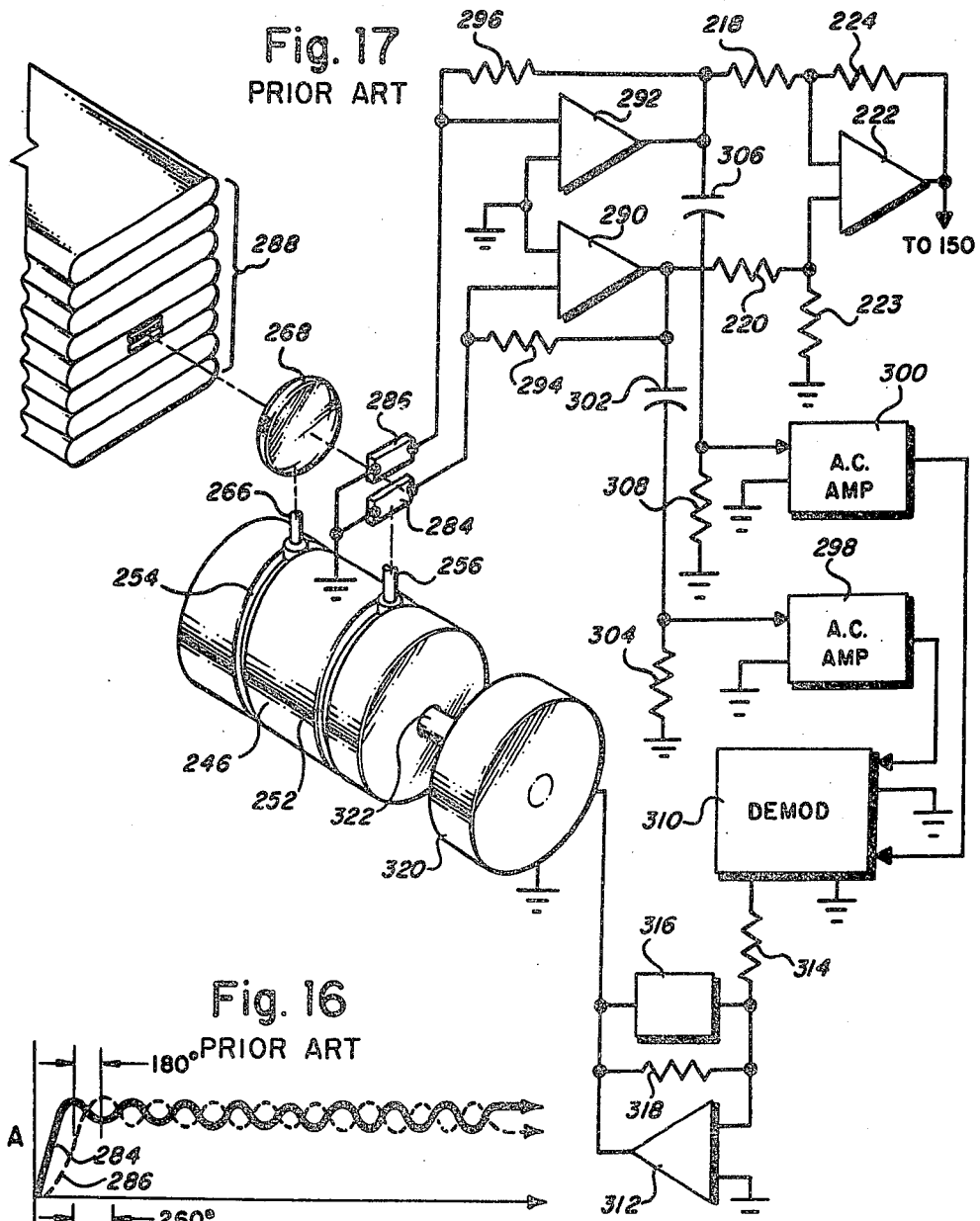
FIG. 17 in perspective and block diagram form shows prior art means for automatically effecting pitch match of sensors.
Figure 16:
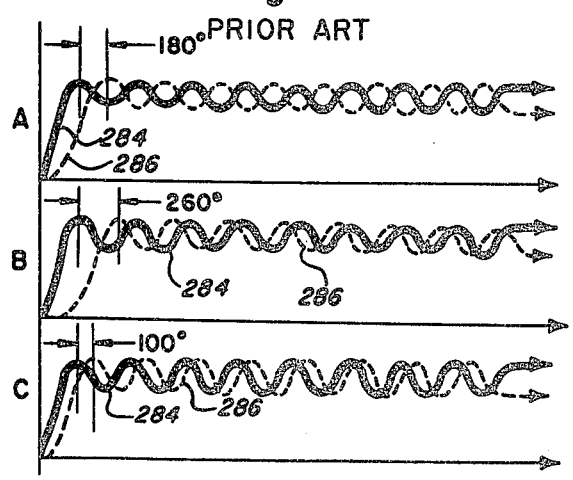
FIG. 16 is a waveform diagram illustrating the waveform outputs of a sensor pair for various conditions of pitch match.

Automatic mechanical pitch match correction is discussed in connection with FIGS. 12 and 13 of the aforementioned WILLITS, et al, patent. These drawing figures are reproduced without change as FIGS. 16 and 17, respectively, herein for convenient reference. The output signals of the two sensors 284 and 286 are shown in FIG. 16A as 180 degrees out of phase as in a perfect pitch match; in FIG. 16B in the case of an overmatch; and in FIG. 16C for an undermatched condition. As discussed in the parent application, the signal phase difference is employed as an error signal in the FIG. 17 apparatus to mechanically effect the desired pitch match.

Figure 18:
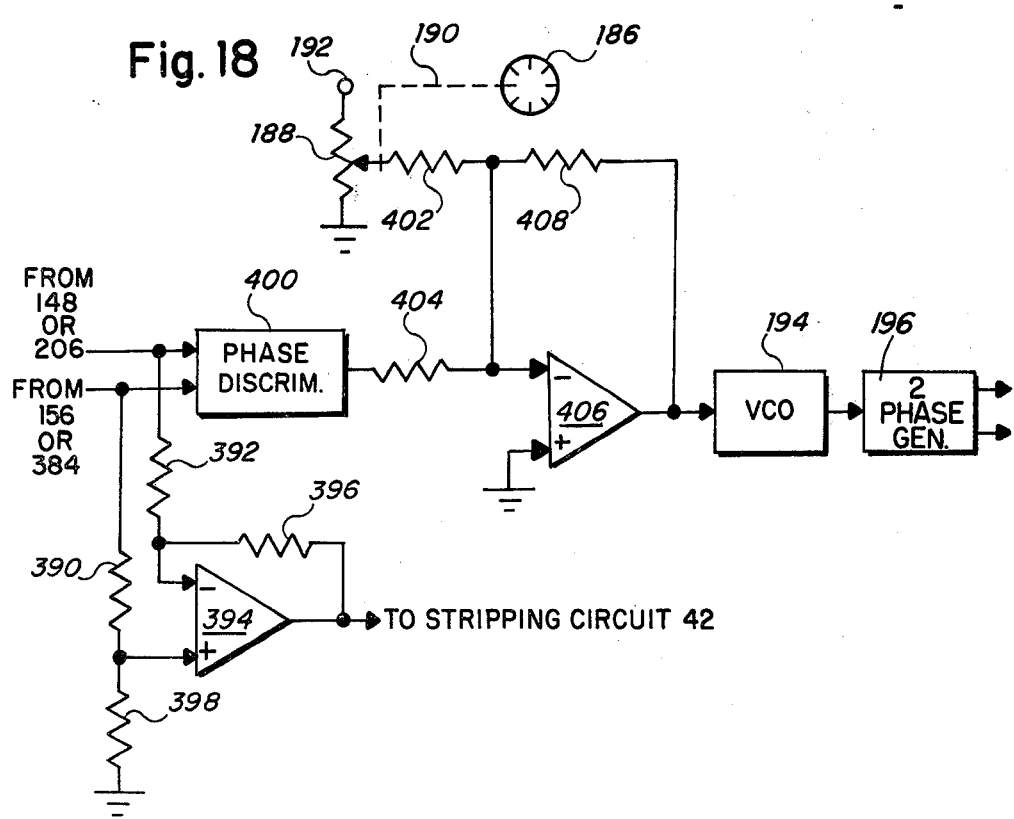
FIG. 18 is a schematic illustration of an invention embodiment adapted to automatically correct pitch match and clock rate errors.

The means for electronically effecting exact pitch match in accord with the invention are illustrated in FIG. 18. As there shown, the half-line output data from amplifiers 206 and 384 of FIG. 13 or full-line output data from amplifiers 148 and 156 of FIG. 7 or amplifiers 344 and 356 of FIG. 11 in addition to being differentially summed in subsequent circuitry as a preliminary to counting processing, are passed to phase demodulator 400, which generates a positive or negative phase error signal voltage at its output. This error voltage is then summed with the output of the generator means (potentiometer 188) by resistors 402 and 404 and amplifier 406 with feedback resistor 408 to correct any error in the setting of potentiometer 188. This phase error signal voltage recorrects the frequency at the output of voltage controlled oscillator 194 to effect a clock output such as to reduce the phase error to zero as would be achieved for a perfect setting of the pitch match dial 186, i.e., to arrive at inputs to phase demodulator 400, that are as shown in FIG. 16A. This same automatic correction system will, within limits, effect a correction for a velocity error whether the error arises due to system misoperation or simply variations in the fixed set-in velocity. While the system of FIG. 18 thus corrects for velocity errors, its range for correction of such errors is ordinarily quite small. Since on many occasions it is desirable to count stacks of material of various thicknesses with a hand-held counter and such hand operation is frequently one with velocity varying beyond the correction capability of the FIG. 18 system, it is necessary in such hand-held systems to provide additional means to continuously and automatically determine the scan velocity over the full range of possible velocities. It is a feature of the invention that scan velocity data be generated with the apparatus of FIG. 19.

In the apparatus heretofore described, it was assumed that scan velocity v was a known constant set in on the pitch match potentiometer as at 136 in FIG. 7 or 192 in FIG. 9. Where the scan system is mechanically actuated as is assumed with the systems of FIGS. 7, 9 and 13, the reference voltage Ev can be accurately predetermined. Where the velocity is a dynamic variable over a wide range, automatic determination of Ev can be made by the system of FIG. 19.

Figure 19:
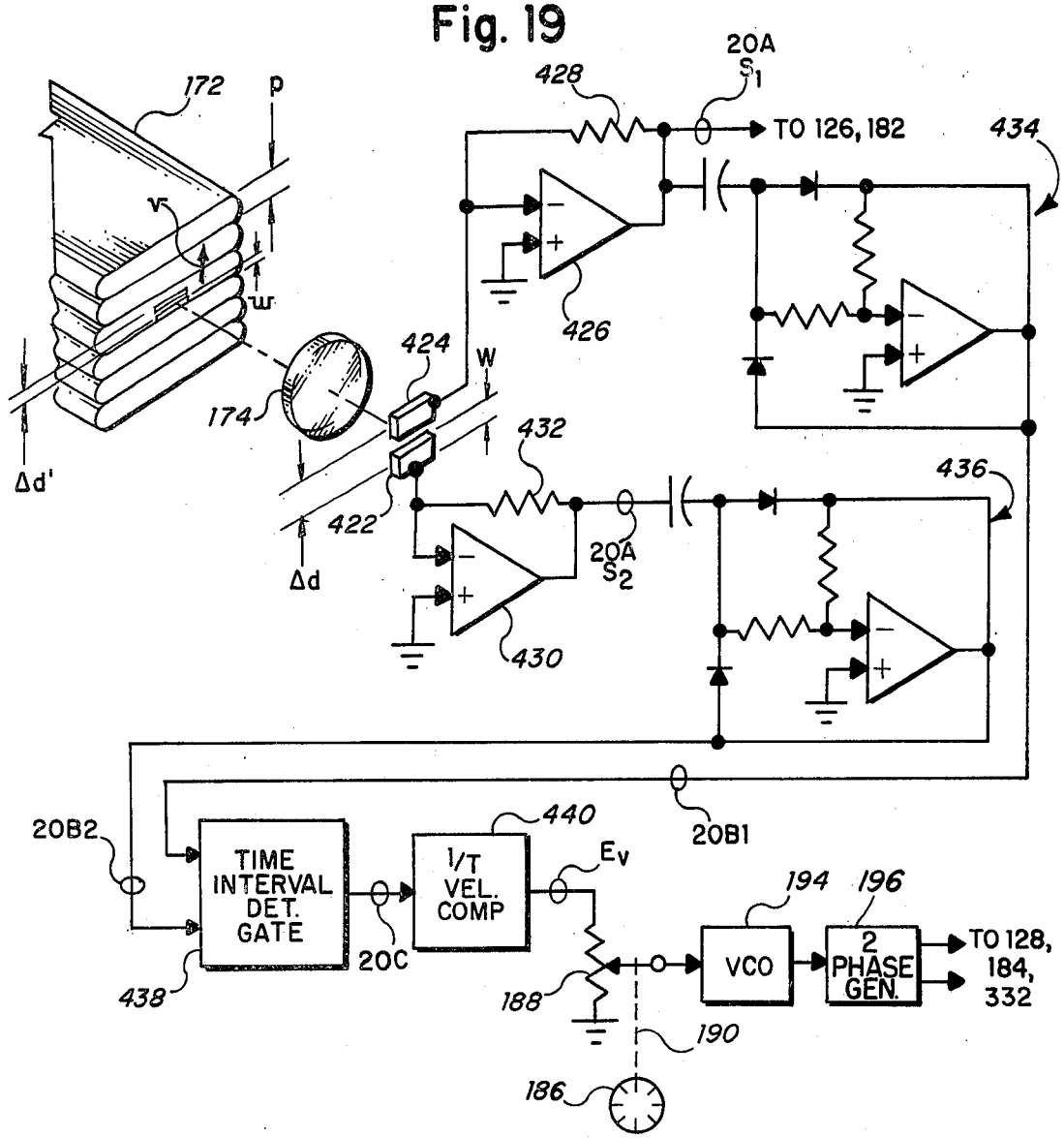
FIG. 19 is a schematic illustration of an invention embodiment adapted to automatically determine scan velocity.

FIG. 19 is similar to FIG. 9, but a second sensor is employed to generate a time lag proportional to the center-to-center distance $\Delta d$ between the two sensors and inversely proportional to the scan velocity, v. FIG. 10A showed the output of the single narrow sensor of FIG. 9 to be analogous to a surface luminescence reflectometer, profiling the surface brightness as the sensor traversed the edges of the stacked material. Track $S_1$ of FIG. 20A, duplicates the output of FIG. 10A for the output of sensor 422 with the addition of a second track $S_2$ for the output of sensor 424. As can be seen from the tracks $S_1$ and $S_2$ of FIG. 20A, the profile generated is both complex and periodic, the time interval $\Delta tv$ being between the same points on the two substantially identical wavetrains. As with the other sensor systems described, preamplifiers 426 and 430 with associated feedback resistors 428 and 432, respectively, amplify the sensors output signals. As can be seen from FIG. 20A, the outputs $S_1$ and $S_2$ of the two sensors are separated by the time interval $\Delta tv$ which is proportional to the known effective physical separation of the sensors $\Delta d$ and inversely to their scan velocity v.

Figure 20:
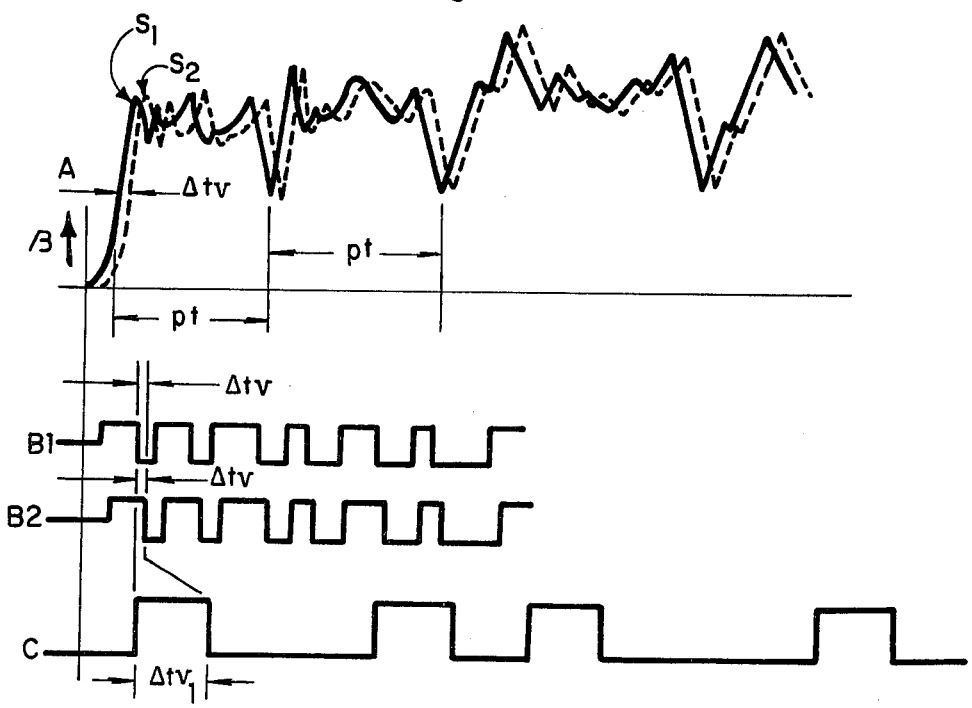
FIG. 20 is a waveform diagram illustrating the waveforms at various points in the circuitry of FIG. 19.

The output $S_1$ of sensor 424 is shown passing to stripper circuit 434. Stripper 434 is identical in function to circuit 42 of the above referenced WILLITS, et al, patent and provides an output that is in the form of a square wave at the highest signal frequency present. The output of stripper 434 is illustrated at FIG. $20B_1$. Similarly, the output of sensor 422 is amplified and is shown passing to stripper 436 whose output is illustrated in FIG. $20B_2$. The output signals of the two stripper circuits are delayed in time relative to each other by the time interval $\Delta tv$ and these outputs are processed in Time Interval Detector Gate 438. By selective gating, Detector Gate 438 converts the two stripper circuit outputs to an output wavetrain as shown in FIG. 20C having output pulses $\Delta tv$, whose duration is inversely proportional to the velocity of scan. As shown in FIG. 20, this conversion is accomplished by having the falling edge of wavetrain $20B_1$ initiate gate 438 and the falling edge of waveform $20B_2$ terminate the gate. Either edge, leading or falling, could be used so long as consistantly used. Velocity computer 440 converts the outputs of Detector Gate 438 to an analog voltage, Ev, proportional to velocity v. Since there are many ways to effect this velocity computation, both analog and digital, a detailed description of the operation and circuitry of Computer 440 will not be discussed herein. The analog voltage Ev, thus determined when supplied to the input of pitch match potentiometer 188 of FIG. 19, will then continuously track velocity changes and fully compensate for any such change.

In the foregoing description of means for electronically synthesizing sensor data, multiple output tap analog delay lines have been described as a discrete time processor for sensor signal output. Obviously, a microprocessor associated with the sensor array of the invention and appropriately programmed could be substituted for the invention circuitry and achieve the same or similar results. However, since the analog delay lines described are much lower in cost than such microprocessors, they are presently preferred. Further, in the discussion of the velocity computer, it should be apparent that if the two waveforms at the sensor outputs are generated by sensors with large effective center-to-center distance, then if there are separations of the material in the stack, the $\Delta tv$ data generated would be ambiguous and of poor quality for providing velocity information. Further, while stripper circuits were employed and are preferred to detect the identical spots on the time sequential waveforms for the velocity computation, other means such as a zero crossover detector in conjunction with a high pass filter, could be used to generate gates equivalent to $B_1$ and $B_2$ of FIG. 20.

The invention has been described in detail herein with particular reference to preferred embodiments thereof. However, it will be understood that variations and modifications can be effected within the spirit and scope of the invention as described herein above and as defined in the appended claims.

What is claimed is:

1. Improved apparatus for counting the quantity of a plurality of similar objects stacked adjacent one another comprising sensor means having an effective width less than the thickness of each of said similar objects, frame means supporting said sensor means for enabling relative movement at velocity v between said sensor means and said similar objects to thereby generate sensor output signals indicative of said quantity, reference voltage source means having a variable output voltage, adjustable clock means connected at its input to said reference voltage source means and responsive to the voltage thereof to generate clock pulses at its output whose frequency is a fixed multiple of sensor output counting data frequency, discrete time processor means coupled at its input to the output of said sensor means and to said clock means and adapted to generate one or more synthesized output signals that are sequentially time delayed with respect to each other in accord with said clock pulses and proportional to said sensor output signals, means for summing said synthesized output signals to provide summed outputs that are the equivalent to the outputs of one or more pitch-matched sensor means, and signal processing and counting means connected to said summing means and responsive to the summed outputs therefrom to count said quantity of stacked objects.

2. An improved counting apparatus in accord with claim 1 wherein said reference voltage source means comprises, in combination, a reference voltage source and means for adjusting said reference voltage source in conformance with the thickness of each of said similar stacked objects and said velocity v.

3. An improved counting apparatus in accord with claim 2 wherein said means for adjusting said voltage comprises potentiometer means connected to a velocity reference source voltage and means for selecting the output of said potentiometer means in accord with the thickness of each of said similar stacked objects.

4. An improved counting apparatus in accord with claim 1 wherein said discrete time processor means comprises multiple output tap analog delay line means.

5. An improved counting apparatus in accord with claim 1 wherein the effective width of said sensor means is ½ that of the thickness of one of said similar stacked objects.

6. An improved counting apparatus in accord with claim 5 wherein said discrete time processor means generates three synthesized output signals sequentially delayed in time with respect to said sensor output signal by the intervals $\Delta t$, $2\Delta t$ and $3\Delta t$.

7. An improved counting apparatus in accord with claim 6 wherein said summing means comprises means for differentially summing the output of said sensor means and the three outputs of said discrete time processor means to thereby provide as a combined output an output that is equivalent to that from the sensor array of a two-line pair system.

8. An improved counting apparatus in accord with claim 1 wherein the effective width of said sensor means is equal to or less than 170 of the thickness of one of said similar stacked objects.

9. An improved counting system in accord with claim 1 wherein the effective width of said sensor means is equal to or less than one-fiftieth (1/50) of the thickness of one of said similar stacked objects.

10. An improved counting system in accord with claim 1 wherein the output of said adjustable clock means is adjusted to provide sixteen sample intervals during the time interval that the sensor passes over ½ the thickness of one of said similar stacked objects.

11. An improved counting system in accord with claim 10 wherein the sequential output taps of said discrete time processor are each sequentially delayed by 1/16th Δt.

12. An improved counting apparatus in accord with claim 11 wherein said summing means comprises one or more resistor banks with varied resistance to thereby provide a shaped transfer function.

13. An improved apparatus for counting the quantity of a plurality of similar objects stacked adjacent one another comprising at least one sensor means comprising a sensor array, the effective width of detection of each of said sensor means being less than the thickness of each of said stacked objects, frame means supporting said sensor array for enabling relative movement between said sensor array and the edges of said stacked objects to thereby generate output signals from said sensor array indicative of said quantity, discrete time processor means connected to the output of said sensor array and responsive thereto to synthesize therefrom one or more synthetic output signals at preselected intervals each representative of at least a portion of the output of one or more single sensors sequentially traversing said edges of said stacked objects, and signal processing and counting means responsive to said synthetic output signals to count the number of said similar objects edges passing before said sensor array, the improvement comprising, clock means to provide output pulses whose frequency is a selected multiple of said sensor means output data frequency, said clock means being connected and responsive to the voltage output of a reference voltage source means, said voltage output being proportional to sensor scan velocity, object thickness, sensor effective width and said preselected intervals, and said discrete time processor means connected at its input to said clock means and said sensor array.

14. Improved counting apparatus in accord with claim 13 wherein said reference voltage source means is supplied with a reference signal at its input that is proportional to sensor velocity and said reference voltage source means output voltage is adjusted in accord with object thickness and said pre-selected interval.

15. Improved counting apparatus in accord with claim 14 further comprising summing means for summing the several portions of a synthesized sensor's output to achieve said synthetic sensor output signals.

16. Improved counting apparatus in accord with claim 15 wherein said summing means comprises means for shaping the transfer function of said synthetic sensor output signals to thereby reduce unwanted harmonics in said synthetic sensor output signals.

17. An improved apparatus for counting the quantity of a plurality of similar objects stacked adjacent one another comprising a sensor array consisting of a single sensor whose effective width is less than the thickness of each of said stacked objects, means for enabling relative movement between said sensor array and the edges of said stacked objects to thereby generate output signals from said sensor array containing information indicative of said quantity, means for synthesizing at least two time sequential output signals from said sensor array output signal each of which synthetic output signals is the equivalent of that from a sensor moving at a fixed scan velocity and whose effective width is substantially proportional to one half object thickness of one of said similar stacked objects and each sequential synthetic signal is delayed in time by an amount that is substantially proportional to one half object thickness when scanned at said fixed scan velocity, and signal processing and counting means responsive to said synthetic output signals to count the number of edges of said similar stacked objects, the improvement comprising, clock means adapted to provide output pulses whose output frequency is a selected multiple of said sensor array output data counting frequency is response to a selected reference voltage that is substantially proportional to the thickness of each of said stacked objects and scan velocity, said clock pulses being applied to the input of said synthesizing means to control the duration of the time delay between sequential synthetic signals, phase demodulator means connected at its input to said two time sequential synthetic output signals to generate an output error signal proportional to any error in said selected reference voltage, and means for summing said output error signal and said reference voltage to thereby correct for any error in said selected command signal at the input of said clock means to make said reference voltage exactly proportional to the thickness of each of said stacked objects.

18. An improved apparatus for counting the quantity of a plurality of similar objects stacked adjacent one another comprising at least one sensor means comprising a sensor array adapted to generate signals indicative of the natural contrast characteristics of individual ones of said similar stacked objects, radiation source means for illuminating the edges of said similar stacked objects with a bean width less than the thickness of each of said similar stacked objects, the width axis of said illuminated area being disposed substantially parallel to the thickness axis of each of said similar stacked objects, frame means supporting said sensor array and said radiation source means for enabling relative movement between said sensor array and said radiation source means and the edges of said similar stacked objects to thereby generate output signals indicative of said quantity, discrete time processor means connected to the output of said sensor array and responsive thereto to synthesize therefrom one or more synthetic output signals at preselected intervals each representative of at least a portion of the output of one or more single sensors sequentially traversing said edges of said similar stacked objects at a fixed scan velocity, and signal processing and counting means responsive to said synthetic output signals to count the number of edges of said similar stacked objects passing before said sensor array, the improvement comprising, clock means to provide output pulses whose frequency is a selected multiple of said sensor means output data frequency, said clock means being connected and responsive to the voltage output of a reference voltage source means, said voltage output being proportional to sensor scan velocity, object thickness, sensor effective width and said preselected intervals, and said discrete time processor means comprises multiple output tap analog delay line means connected at its input to said clock means and said sensor array.

19. Improved counting apparatus in accord with claim 18 wherein said reference voltage source means is supplied with a reference signal at its input that is proportional to sensor fixed scan velocity and said reference voltage source means output voltage is adjusted in accord with object thickness, and said preselected interval.

20. Improved counting apparatus in accord with claim 19 further comprising summing means for summing the several portions of a synthetic sensor's output to achieve said synthetic sensor's output signal.

21. An improved apparatus for counting the quantity of a plurality of similar objects stacked adjacent to one another comprising a sensor array having two sensors each of whose effective width is less than one-half of the thickness of each of said stacked objects, said sensors being spaced apart a known distance, means for enabling relative movement between said sensor array and the edges of said stacked objects to thereby generate time sequential output signals from said two sensors containing information indicative of said quantity, the time delay interval between said time sequential signals being inversely proportional to the velocity of said relative movement and said known distance, discrete time processor means connected to the output of said sensor array and responsive thereto to synthesize therefrom one or more synthetic output signals at preselected intervals each representative of at least a portion of the output of one or more signal sensors sequentially traversing the edges of said stacked objects, and signal processing and counting means responsive to said synthesized output signals to count the number of said edges of said similar stacked objects, the improvement comprising,
  computing means connected and responsive to said time sequential output signals from said two sensors to provide a time delay interval output signal,
  velocity computer means connected at its input to said computing means time delay interval output signal and responsive thereto to generate a velocity command signal at its output,
  generator means connected at its input to said velocity command signal and adjustable in accord with the thickness of an individual one of said stacked objects to generate a combined velocity-thickness command signal, and
  clock means connected at its input to the output of said generator means to provide output pulses whose frequency is a selected multiple of said sensor array output data counting frequency responsive to said combined velocity-thickness command signal, said clock pulses being applied to the input of said discrete time processor means to control the duration of the time delay between sequential synthesized signals.

22. An improved counting apparatus in accord with claim 21 wherein the effective width of each of said sensors is equal to or less than one-thirty-second (1/32) of the thickness of one of said stacked objects.

23. An apparatus for synthesizing from the output signals of a single sensor traversing the edges of a plurality of similar objects stacked adjacent one another, synthetic output signals that are the equivalent of one or more sensors each of whose effective widths is pitch-matched to the thickness of individual ones of said similar stacked objects, comprising,
  sensor means having an effective width less than the thickness of each of said similar objects,
  frame means supporting said sensor means for enabling relative movement between said sensor means and said similar objects to thereby generate sensor output signals indicative of said quantity,
  reference voltage source means,
  clock means connected at its input to said reference voltage source means and responsive to the output voltage thereof to generate clock pulses at its output whose frequency is a selected multiple of sensor output counting data frequency,
  discrete time processor means coupled at its input to the output of said sensor means and to said clock means and adapted to generate one or more sequentially time delayed output signals the delay of each with respect to each other being in accord with the frequency of said output clock pulses and of a magnitude proportional to said sensor output signals,
  means for summing said sequentially time delayed output signals to provide summed outputs that are the equivalent of the outputs of one or more pitch matched sensor means.

24. In a method for counting the quantity of a plurality of similar objects arranged in a stack, the steps of imaging a sensor array on the edges of said similar stacked objects, the image width of each sensor comprising said sensor array being less than the thickness of any one of said similar stacked objects,
  effecting relative movement between said sensor array and the edges of said similar stacked objects at a substantially constant known rate while maintaining the width axis of said sensor array substantially parallel to the thickness axis of each of said similar stacked objects to thereby generate output signals indicative of the quantity of said edges,
  generating clock pulses at a frequency that is a fixed multiple of sensor output counting data frequency,
  processing said sensor output signals to generate one or more sequentially time delayed output signals the delay of each with respect to each other being in accord with the frequency of said clock pulses and of a magnitude proportional to said sensor output signals,
  summing said sequentially time delayed output signals to provide an output equivalent to the output of one or more pitch matched sensors,
  processing said summed synthetic output signals to provide a pulse train wherein the total quantity of pulses is equal to the quantity of said similar stacked objects, and
  counting said total quantity of pulses in said pulse train to provide an indication thereof and thereby the quantity of said similar stacked objects.

25. In a method for counting the quantity of a plurality of similar objects arranged in a stack, the steps of
  imaging a sensor array on the edges of said similar stacked object, the image width of each sensor comprising said sensor array being less than one-half ($\frac{1}{2}$) the thickness of any one of said similar stacked objects,
  effecting relative movement between said sensor aray and the edges of said similar stacked objects at a substantially constant known rate while maintaining the width axis of said sensor array substantially parallel to the thickness axis of each of said similar stacked objects to thereby generate output signals indicative of the quantity of said edges, generating clock pulses at a frequency that is a fixed multiple of sensor output counting data frequency, processing said sensor output signals to generate one or more sequentially time delayed output signals the delay of each with respect to each other being in accord with the frequency of said clock pulses and of a magnitude proportional to said sensor output signals, summing said sequentially time delayed output signals to provide an output equivalent to the output of one or more pitch matched sensors, processing said summed sequentially time delayed output signals to provide a pulse train wherein the total quantity of pulses is equal to the quantity of said similar stacked objects, and counting the quantity of pulses in said pulse train and providing an indication thereof.

26. The method for counting set forth in claim 25 wherein said generated clock pulses are at a frequency that effects a time interval between each of said sequential time delayed output signals that is equal to one-sixteenth (1/16) of the time interval during which each sensor passes over one-half the thickness of one of said similar stacked objects.

27. The method for counting set forth in claim 25 further comprising the steps of adjusting said clock pulse frequency in accord with the thickness of each of said similar stacked objects.

28. The method for counting set forth in claim 27 further comprising the step of adjusting said clock pulse frequency in accord with said substantially constant known rate of relative movement.

29. The method for counting set forth in claim 25 further comprising the step of shaping the transfer function of each of said sequentially time delayed output signals to reduce unwanted harmonics present in said sensor output signals.

30. In a method for counting the quantity of a plurality of similar objects arranged in a stack, the steps of imaging a sensor array on the edges of said similar stacked objects, the image width of each sensor comprising said sensor array being less than the thinest of each one of the similar stacked objects it is desired to count, effecting relative movement between said sensor array and the edges of said similar stacked objects while maintaining the velocity vector of said sensor array substantially perpendicular to the thickness axis of said similar stacked objects to thereby generate one or more output signals each of which is indicative of the quantity of said edges, generating a reference voltage proportional to the velocity of said relative movement and the thickness of each of said similar stacked objects, generating clock pulses at a frequency proportional to said reference voltage, generating one or more time sequential sensor output signals from one of said sensor output signals, successive ones of said time sequential sensor output signals being time delayed from that preceding it by an amount proportional to the interval between each of said clock pulses and having a magnitude proportional to said sensor output signals, summing said successive ones of said time sequential sensor output signals over time intervals equal to that required for a sensor image to traverse one-half (½) the thickness of one of said similar stacked objects to provide one or more time sequential composite synthetic sensor output signals each of which is equivalent to that of a half-line sensor system as it traverses said plurality of similar stacked objects, processing said time sequential composite synthetic sensor output signals to provide a pulse train wherein the total quantity of pulses is equal to the quantity of said similar stacked objects, and counting the quantity of pulses in said pulse train and providing an indication thereof.

31. The method for counting set forth in claim 30 further comprising the step of differentially summing two time sequential composite synthetic sensor output signals to thereby form a line-pair output signal.

32. The method for counting set forth in claim 30 further comprising the steps of phase demodulating two time sequential composite synthetic sensor output signals to thereby generate error signals, adding said error signals to said reference voltage to thereby correct the frequency of said clock pulses.

33. In a method for counting the quantity of a plurality of similar objects arranged in a stack, the steps of imaging a sensor array comprising two sensors on the edges of said similar stacked objects, the image width of each of said sensors being less than the thinest of each one of the similar stacked objects it is desired to count and the spacing between said sensors being less than sensor width, effecting relative movement between said sensor array and the edges of said similar stacked objects while maintaining the velocity vector of said sensor array substantially perpendicular to the thickness axis of said similar stacked objects to thereby generate two time sequential sensor output signals each of which is indicative of the quantity of said edges and the interval between said two time sequential sensor output signals is proportional to the spacing between said sensors and inversely proportional to the velocity of said relative movement, amplifying and stripping each of the two time sequential sensor output signals to provide stripped output signals at the highest signal frequency present, detecting the time delay between said two stripped output signals to provide a pulse train output with individual pulse duration being inversely proportional to the velocity of said relative movement, converting said pulse train output to a voltage signal proportional to the velocity of said relative movement, generating a reference voltage from said velocity voltage signal that is proportional to both said velocity and the thickness of said similar stacked objects, generating clock pulses at a frequency proportional to said reference voltage, generating one or more time sequential synthetic sensor output signals from one of said two time sequential sensor output signals, successive ones of said synthetic sensor output signals being time delayed from that preceding it by an amount proportional to the interval between each of said clock pulses, each of said time sequential synthetic sensor output signals having a magnitude proportional to said time sequential sensor output signals, summing said successive ones of said time sequential synthetic sensor output signals over time intervals equal to that required for a sensor image to traverse one-half (½) the thickness of one said similar stacked objects to provide one or more composite synthetic sensor output signals each of which is equivalent to that one a half-line sensor system, processing said time sequential composite synthetic sensor output signals to provide a pulse train wherein the total quantity of pulses is equal to the quantity of said similar stacked objects, and counting the quantity of pulses in said pulse train and providing an indication thereof.

34. In a method for counting the quantity of a plurality of similar objects arranged in a stack, the steps of illuminating the edges of said similar stacked objects with a beam whose width is less than the thickness of each of said similar stacked objects, the width axis of said illuminated area being disposed substantially parallel to the thickness axis of each of said similar stacked objects, imaging a sensor array on said illuminated edges of said similar stacked objects, effecting relative movement between said sensor array and said illuminated edges of said similar stacked objects at a substantially constant known velocity while maintaining the width axis and illumination of said sensor array substantially parallel to the thickness axis of each of said similar stacked objects to thereby generate sensor output signals at a frequency proportional to said velocity and the thickness of said stacked objects and that is indicative of the quantity of said edges, generating clock pulses at a frequency that is a fixed multiple of sensor output counting data frequency, processing said sensor output signals to generate one or more sequentially time delayed output signals the delay of each with respect to each other being in accord with the frequency of said clock pulses and of a magnitude proportional to said sensor output signals, summing said sequentially time delayed output signals to provide an output equivalent to the output of one or more pitch matched sensors, processing said summed synthetic output signals to provide a pulse train wherein the total quantity of pulses is equal to the quantity of said similar stacked objects, and counting the quantity of pulses in said pulse train and providing an indication thereof.

* * * * *